Patented July 7, 1931

1,812,921

UNITED STATES PATENT OFFICE

ALBERT RENÉ BOIDIN, OF SECLIN, AND IVAN AUGUSTE EFFRONT, OF MARCQ EN BAROEUL, FRANCE

UNHAIRING AND BATING OF SKINS

No Drawing. Application filed October 17, 1929, Serial No. 400,441, and in France October 29, 1928.

This invention has for object an improved process for unhairing and bating skins, according to which the skins are first soaked in water, then steeped at a temperature not exceeding 18° C., during about 24 hours, in a bath containing an alkaline salt of low alkalinity and an unhairing enzyme.

This process can be carried out for instance as follows:

The skins soaked by one of the already known methods are directly dipped in an alcaline bath where the pH is equal, for instance, to 8,0 to 8,5 and the action of the enzymes takes place at the same pH or in the vicinity of this pH. One may also choose for the treatment by the enzymes a lower pH in a slightly acid medium and in presence, for instance of 1 per 1000 of ammonium fluoride.

One may also treat at first the skins at the pH 7,0 to 8,5 by the enzymes and later by the solution of feeble alcalinity, but in the latter case the results are not so regular.

As alcaline bath, one may especially make use of any solution of feeble alcalinity showing a pH of 8,0 to 9,0 like the mixtures of borax, silicates and fluosilicates, arsenides or alcaline arsenates, polybasic phosphates, sodiumbicarbonates or also carbonates and alcaline bicarbonates. One may utilize one or other of these salts, or several of these salts simultaneously or successively and make use as well of the organic as of the inorganic salts, such as every alcaline combination of amino-acids or proteins. The use of caustic alcalis is totally avoided, except for the elimination of the calcium carbonate of the water to be used for the washings.

This method may be applied to every kind of skins, to small as well as to heavy hides, it suffices to change the duration of the treatment or the concentration of the alcaline non-caustic solutions mentioned above as examples.

This method eliminates every heating of the baths utilized for unhairing: contrary to what has been done for the processes formerly known, the treatment is effected to the ordinary temperature and by avoiding a temperature higher than 20° C. and preferably between 13° and 15° C.

Here is given, as an example, the method preferably chosen for the unhairing of the sheep skins bearing wool of high value.

The skins, previously soaked by one of the known methods are placed in a drum, in a paddle, or in any other apparatus utilized in the leather industry, in which the skins or the solution may be constantly kept in motion in order to insure an even action on all parts of every skin; the drum previously contains a solution of 50 to 100 grams of sodiumcarbonate per liter of water and this is in the proportion of 4 to 10 liters per kilogram of skin; after 24 hours, the solution of bicarbonate is thrown out and it is replaced by the same volume of water containing 2 to 10 grams of unhairing enzyme per liter; after 20 to 24 hours and although the bath has not been heated, the skin is ready to be unhaired. It is not necessary to reject the solution of bicarbonate, the enzyme being able to act in the presence of a feebly alcaline solution and in the absence of caustic alcalis. The skins are then treated by one of the known methods of unhairing by hand or by an unhairing machine or of bating in order to eventually give to the skin the necessary suppleness.

It has been demonstrated that it is particularly advantageous in the process to apply the enzymatic treatment in two phases, that is to say to utilize at first a small proportion of the proteolytic enzymes in the first alcaline bath for the plumping of the skin, and later on, after nearly 24 hours, to replace this bath by an alcaline or neutral bath containing, for instance, 5 to 10 grams per liter of proteolytic enzymes.

Here again one may simplify the method of working by steeping the completely soaked skins for 24 hours in a sodium bicarbonate bath, or similar bath, containing as an example, one to two-tenths of the quantity of enzyme which is necessary for the unhairing, and afterwards to add the 9 or 8 tenths of the quantity of enzyme necessary for the epilation in the plumping bath. The latter method gives the best results as regard the beauty of the grain surface, the feeling and the quality of the unhaired skin.

These two methods of working do not exclude the treatment of the skins at the temperatures of 35–40° C., ordinarily in use for the bating of the skins; in this case the skins are still preferably dipped in a cold solution of sodiumbicarbonate, i. e. at the ordinary temperature; afterwards, after 24 hours, the solution of bicarbonate or carbonate is replaced by water previously heated to 45–50° C., this tepid water is run on the skins whilst the drum is in motion and the solution of enzyme is immediately added to this bath. One may thus obtain a temperature of 40° C. in the mixture; in this case the proportions of enzymes are reduced by half but the part of dissolved collagen is inevitably increased. Here again the progressive plumping in the sodiumbicarbonate, for instance, will act in such a way as to reduce the weakening of the skins and the bating and the unhairing will be effected simultaneously (as in the French Patent No. 434,158) and at the same time a better skin than by any other process will be the result.

In the case of tawed skins, or, if very supple skins are desired, one may omit the drenching by extending the time of the enzymatic action or by increasing the proportion of enzymes added to the bath.

As regards enzymes one uses preferably the unhairing enzymes produced by the bacteria, but one may substitute for these the enzymes secreted by molds of fungi, the enzymes of the vegetable kingdom as well as the animal enzymes; but by the use of enzymes other than bacterial enzymes produced by processes already known, we must carefully increase the proportion of antiseptics, because most industrial enzymatic products contain putrefying bacteria and they require for their action, temperatures lying between 20–30° C. and more, which are very favorable to putrefaction.

As the solutions of sodiumbicarbonate are utilized several times, it is useful to add to these solutions some quantities of antiseptics which ought to be increased with the temperature, for instance: 1 to 3 per 1000 of phenols, naphthols, chloroform in order to completely hinder the growth of putrefying bacteria. During winter this aim will be generally attained by adding 5 to 10 grams of borax per liter.

It is obvious for the men in this profession that the times and concentrations will be varied with the kind and the origin of the skin to be treated.

The process above described affords the following advantages:

It is the most simple and economical amongst the known processes; any danger of damaging the skins or the hair is rigorously avoided. The hair or the wool are of a quality far above that produced by the sweating system or by solutions of caustic alcalis, its strength is the highest on account of the suppression of every treatment at temperatures of 25–40° C. as indicated in the newspaper "Le Cuir Technique", (Octobre 1928, pp. 407 and 408) or in the French Patent No. 640,112. The skins retain their strength and all their qualities, the treatment at low temperature enables us to unhair without it being possible to detect any action of bating, the hair becomes a matter of choice for the manufacture of felts and belts and, if it is necessary to bate, one may operate at 25–30° C. in order to get suppleness, without weakening. It is also noteworthy that every chance of overbating is eliminated by the use of bacterial enzymes. The use of acids like lactic, butyric, formic acids is totally superfluous. At last this process affords a saving of hand labour owing to the suppressions of the survey necessary in the sweating system, there is no need to survey the temperature of the baths. By this process one suppresses the sweating, the painting of the flesh side, the liming, the use of sulfides, the deliming bates, the acids, it renders also useless the drenching of tawed skins. The increase in the value of the hair is sufficient to cover the whole of the expenses of the treatment, of the chemicals and of the labour.

Claims:

1. Process for unhairing and bating skins, which consists in completely soaking the skins in water, and in steeping the said skins, at a temperature not exceeding 18° C., during about 24 hours, in a bath containing an alkaline salt of low alkalinity and an unhairing enzyme.

2. Process for unhairing and bating skins, which consists in completely soaking the skins in water, in steeping the said skins, at a temperature not exceeding 18° C., during about 24 hours, in a bath containing an alkaline salt of low alkalinity and a small proportion of the quantity of unhairing enzyme necessary for the unhairing operation, and in adding to this bath, after swelling, the remainder of the total quantity of enzyme to be used for the unhairing operation.

3. Process for unhairing and bating skins, which consists in completely soaking the skins in water, in steeping the same, at a temperature not exceeding 18° C., during about 24 hours, in a bath of low alkalinity containing a small portion of the quantity of unhairing enzyme necessary for complete unhairing of the skins, and in adding to this bath, after swelling, the remainder of the said quantity of enzyme necessary for complete unhairing and of an acid so as to render the said bath slightly acid.

In testimony whereof we have hereunto affixed our signatures.

ALBERT RENÉ BOIDIN.
IVAN AUGUSTE EFFRONT.